United States Patent
Ding et al.

(10) Patent No.: US 12,340,711 B2
(45) Date of Patent: Jun. 24, 2025

(54) INFORMATION PROCESSING METHOD AND DEVICE

(71) Applicant: DOUYIN VISION CO., LTD., Beijing (CN)

(72) Inventors: Jiangcun Ding, Beijing (CN); Ziyao Lin, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/364,321

(22) Filed: Aug. 2, 2023

(65) Prior Publication Data

US 2024/0046808 A1    Feb. 8, 2024

(30) Foreign Application Priority Data

Aug. 2, 2022  (CN) .......................... 202210924037.8

(51) Int. Cl.
　　*G09B 5/02*　　(2006.01)
　　*H04N 21/2187*　　(2011.01)
(52) U.S. Cl.
　　CPC ........... *G09B 5/02* (2013.01); *H04N 21/2187* (2013.01)
(58) Field of Classification Search
　　CPC .............................. G09B 5/02; H04N 21/2187
　　See application file for complete search history.

(56) References Cited

U.S. PATENT DOCUMENTS

2020/0413135 A1   12/2020   Jia

FOREIGN PATENT DOCUMENTS

| CN | 111683263 A | 9/2020 |
|----|----|----|
| CN | 113115094 A | 7/2021 |
| CN | 113269585 A | 8/2021 |
| CN | 113784155 A | 12/2021 |
| CN | 114697688 A | 7/2022 |
| CN | 115278286 A | 11/2022 |
| WO | 2022134689 A1 | 6/2022 |

OTHER PUBLICATIONS

ISA China National Intellectual Property Administration, International Search Report Issued in Application No. PCT/CN2023/110456, Oct. 18, 2023, WIPO, 16 pages.

*Primary Examiner* — Kesha Frisby
(74) *Attorney, Agent, or Firm* — Alleman Hall & Tuttle LLP

(57) ABSTRACT

An information processing method may be applied to a client. The client receives a trigger operation on a first resource. After receiving the trigger operation on the first resource, the client displays a detail page of the first resource in response to the trigger operation on the first resource. The first resource is a live guidance resource. The detail page of the first resource displayed on the client may include multiple tasks included in the first resource. The multiple tasks include a learning task and a practice task. The learning task includes a live-type learning task, and the practice task includes a live-type practice task. The practice task is used for practicing on content corresponding to the learning task. As can be seen, with this solution, the interactive demands of the user for live streaming learning and practice are satisfied.

20 Claims, 7 Drawing Sheets

INFORMATION PROCESSING METHOD AND DEVICE

CROSS-REFERENCE TO RELATED APPLICATIONS

This application claims priority to Chinese Patent Application No. 202210924037.8, titled "INFORMATION PROCESSING METHOD AND DEVICE", filed on Aug. 2, 2022, which is hereby incorporated by reference in its entirety.

FIELD

The present disclosure relates to the field of computer technology, and in particular to an information processing method and device.

BACKGROUND

A user may use an application to post a video. For example, the user may use an application to initiate a live broadcast. The application may also provide functions related to video posting. Currently, users often cannot expertly apply the functions provided by the application when posting videos though the application, which results in a poor user experience in posting videos using the application.

Therefore, there is an urgent need for a solution that can solve the above problems.

SUMMARY

In order to solve or partially solve the above technical problems, an information processing method and device are provided in embodiments of the present disclosure.

In a first aspect, an information processing method is provided according to an embodiment of the present disclosure. The method includes:
  receiving a trigger operation on a first resource, where the first resource is a live guidance resource; and
  displaying a detail page of the first resource, in response to the trigger operation on the first resource, where the detail page of the first resource is used for displaying multiple tasks included in the first resource, the multiple tasks includes a learning task and a practice task, the learning task includes a live-type learning task, the practice task includes a live-type practice task, and the practice task is used for practicing on content corresponding to the learning task.

In an embodiment, the first resource is a live-start guidance resource, the learning task is a watch task for a live-start guidance video, and the practice task is a live-start task. The method further includes:
  displaying a live-start page, in response to a trigger operation on the practice task; and/or,
  displaying a video play page to play the live-start guidance video, in response to a trigger operation on the learning task.

In an embodiment, the method further includes:
  displaying a live page, in response to a live-start confirmation operation triggered on the live-start page, where the live page includes information on a first to-be-practiced live operation, and the information on the first to-be-practiced live operation includes: a name of the first to-be-practiced live operation and a completion progress of the first to-be-practiced live operation.

In an embodiment, the live page further includes a first control, where the first control is used to trigger a display of detailed information of the first resource.

In an embodiment, the first resource is associated with a first virtual object, the practice task is a last task among the multiple tasks, and the first to-be-practiced live operation is a last to-be-practiced operation in the practice task. The method further includes:
  displaying an identification of the first virtual object in the live page, within a predetermined time period after the first to-be-practiced live operation is completed.

In an embodiment, the displaying the identification of the first virtual object in the live page includes:
  replacing the first control for triggering the display of the detailed information of the first resource with the identification of the first virtual object.

In an embodiment, the first resource is associated with the first virtual object, and method further includes:
  displaying a first window, in response to a completion of the multiple tasks included in the first resource, where the first window is used for displaying an identification, descriptive information and an acquisition control of the first virtual object; and
  acquiring the first virtual object, in response to a trigger operation on the acquisition control.

In an embodiment, the method further includes:
  displaying a live page, in response to a live-start confirmation operation triggered on the live-start page; and
  playing the live-start guidance video on the live page in a window mode in a live starting process.

In an embodiment, the method further includes:
  displaying the detailed information of the first resource, in response to a trigger operation on the first control, where the detailed information of the first resource includes the multiple tasks; and
  outputting a prompt message, in response to a trigger operation on a learning task in the multiple tasks, where the prompt message is used to indicate that the learning task is incapable of being started during the practice task.

In an embodiment, the method further includes:
  replacing the information on the first to-be-practiced live operation in the live page with information on a second to-be-practiced live operation, in response to a completion of the second to-be-practiced live operation, where the information on the second to-be-practiced live operation includes: a name of the second to-be-practiced live operation and a completion progress of the second to-be-practiced live operation.

In an embodiment, the method further includes:
  displaying a first page in response to a live-stop operation, where the first page includes information on a second resource, the information on the second resource includes a name of the second resource and a completion status of the second resource, and the second resource is a live guidance resource.

In an embodiment, the second resource is associated with a second virtual object, and the information on the second resource further includes an identification of the second virtual object.

In an embodiment, the method further includes:
  displaying a second page, in response to a trigger operation for the information on the second resource, where the second page includes at least one live guidance resource, and the at least one live guidance resource includes the first resource and the second resource.

In an embodiment, the second page includes a first display area and a second display area, the first display area is used for displaying the at least one live guidance resource, the second display area is used for displaying information on a third resource in the at least one live guidance resource, the information on the third resource includes a name of the third resource and a completion status of the third resource, and the third resource is a resource that is ranked first in multiple resources sorted according to a predetermined rule.

In a second aspect, an information processing device is provided in an embodiment of the present disclosure. The device includes: a receiving unit and a first display unit.

The receiving unit is configured to receive a trigger operation on a first resource, where the first resource is a live guidance resource.

The first display unit is configured to display a detail page of the first resource, in response to the trigger operation on the first resource, where the detail page of the first resource is used for displaying multiple tasks included in the first resource, the multiple tasks includes a learning task and a practice task, the learning task includes a live-type learning task, the practice task includes a live-type practice task, and the practice task is used for practicing on content corresponding to the learning task.

In an embodiment, the first resource is a live-start guidance resource, the learning task is a watch task for a live-start guidance video, and the practice task is a live-start task. The device further includes:

a second display unit configured to display a live-start page, in response to a trigger operation on the practice task; and/or a third display unit configured to display a video play page to play the live-start guidance video, in response to a trigger operation on the learning task.

In an embodiment, the device further includes: a fourth display unit.

The fourth display unit is configured to display a live page, in response to a live-start confirmation operation triggered on the live-start page, where the live page includes information on a first to-be-practiced live operation, and the information on the first to-be-practiced live operation includes a name of the first to-be-practiced live operation and a completion progress of the first to-be-practiced live operation.

In an embodiment, the live page further includes a first control, where the first control is used to trigger a display of detailed information of the first resource.

In an embodiment, the first resource is associated with a first virtual object, the practice task is a last task among the multiple tasks, and the first to-be-practiced live operation is a last to-be-practiced operation in the practice task. The device further includes: a fifth display unit.

The fifth display unit is configured to display an identification of the first virtual object in the live page, within a predetermined time period after the first to-be-practiced live operation is completed.

In an embodiment, the fifth display unit is configured to: replace the first control for triggering the display of the detailed information of the first resource with the identification of the first virtual object.

In an embodiment, the first resource is associated with the first virtual object, and the device further includes: a fifth display unit and an acquisition unit.

The fifth display unit is configured to display a first window, in response to a completion of the multiple tasks included in the first resource, where the first window is used for displaying an identification, descriptive information and an acquisition control of the first virtual object.

The acquisition unit is configured to acquire the first virtual object, in response to a trigger operation on the acquisition control.

In an embodiment, the device further includes: a sixth display unit and a playing unit.

The sixth display unit is configured to display a live page, in response to a live-start confirmation operation triggered on the live-start page.

The playing unit is configured to play the live-start guidance video on the live page in a window mode in a live starting process.

In an embodiment, the device further includes: a seventh display unit and an output unit.

The seventh display unit is configured to display the detailed information of the first resource, in response to a trigger operation for the first control, where the detailed information of the first resource includes the multiple tasks.

The output unit is configured to output a prompt message, in response to a trigger operation on a learning task in the multiple tasks, where the prompt message is used to indicate that the learning task is incapable of being started during the practice task.

In an embodiment, the device further includes: a replacement unit.

The replacement unit is configured to replace the information on the first to-be-practiced live operation in the live page with information on the second to-be-practiced live operation, in response to a completion of a second to-be-practiced live operation, where the information on the second to-be-practiced live operation includes a name of the second to-be-practiced live operation and a completion progress of the second to-be-practiced live operation.

In an embodiment, the device further includes: an eighth display unit.

The eighth display unit is configured to display a first page, in response to a live-stop operation, where the first page includes information on a second resource, the information on the second resource includes a name of the second resource and a completion status of the second resource, and the second resource is a live guidance resource.

In an embodiment, the second resource is associated with a second virtual object, and the information on the second resource further includes an identification of the second virtual object.

In an embodiment, the device further includes: a ninth display unit.

The ninth display unit is configured to display a second page, in response to a trigger operation for the information on the second resource, where the second page includes at least one live guidance resource, and the at least one live guidance resource includes the first resource and the second resource.

In an embodiment, the second page includes a first display area and a second display area, the first display area is used for displaying the at least one live guidance resource, the second display area being used for displaying information on a third resource of the at least one live guidance resource, the information on the third resource includes a name of the third resource and a completion status of the third resource, and the third resource is a resource that is ranked first in multiple resources sorted according to a predetermined rule.

In a third aspect, an apparatus is provided in an embodiment of the present disclosure. The apparatus includes a processor and a memory.

The processor is configured to execute instructions stored in the memory, to cause the apparatus to perform the method described in any of the first aspect above.

In a fourth aspect, a computer readable storage medium is provided in an embodiment of the present disclosure. The computer readable storage medium includes instructions, and the instructions are configured to instruct an apparatus to perform the method described in any of the first aspect above.

In a fifth aspect, a computer program product is provided in an embodiment of the present disclosure. The computer program product, when executes on a computer, causes the computer to perform the method described in any of the first aspect above.

BRIEF DESCRIPTION OF THE DRAWINGS

In order to more clearly illustrate technical solutions in embodiments of the present disclosure or conventional technology, accompanying drawings used in the description of the embodiments or conventional technology will be briefly described in the following. Obviously, the accompanying drawings in the following description only show some embodiments described in the present disclosure. For those of ordinary skill in the art, other drawings may be obtained from these accompanying drawings without creative efforts.

DETAILED DESCRIPTION

In order to enable those skilled in the art to better understand solutions of the present disclosure, technical solutions in embodiments of the present disclosure will be clearly and completely described below in conjunction with the accompanying drawings in the embodiments of the present disclosure. Obviously, the described embodiments are only a part of embodiments of the present disclosure, rather than all of embodiments. Based on the embodiments in the present disclosure, any other embodiment obtained by ordinary skilled in the art without creative efforts shall fall within the scope of protection of the present disclosure.

Inventors of the present disclosure have found by research that at present, there is a lack of effective solutions for users to interact with live guidance resources in the live streaming scenario, which cannot meet the demands of a large number of users who wish to start broadcasts smoothly and use various live functions smoothly. For example, the user may learn live functions of an application by watching a live learning video, and thus use the functions during the live streaming. However, even if the user watches the live learning video, he or she cannot well master the live functions involved in the video. Thus, the user still cannot well use the live functions provided by the application in an actual live streaming, resulting in poor user experience of live streaming through the application.

In order to solve the above problems, an information processing method and device are provided in embodiments of the present disclosure. The information processing method and device according to the embodiments of the present disclosure may be applied to the live streaming scenario.

The information processing method is provided according to the embodiments of the present disclosure, which may be applied to a client in one example. The client receives a trigger operation for a first resource. After receiving the trigger operation for the first resource, the client display a detail page of the first resource in response to the trigger operation for the first resource. The first resource is a live guidance resource. The detail page of the first resource displayed on the client may include multiple tasks included in the first resource. The multiple tasks include a learning task and a practice task. The learning task includes a live-type learning task, and the practice task includes a live-type practice task. The practice task is used for practicing on content corresponding to the learning task. As can be seen, this solution may satisfy the interactive demands of the user for live learning and practice, which facilitates users to use the live function, and improves the efficiency of live broadcast.

Various non-limiting embodiments of the present disclosure are described in detail below in conjunction with the accompanying drawings.

Exemplary Method

Figure 1:
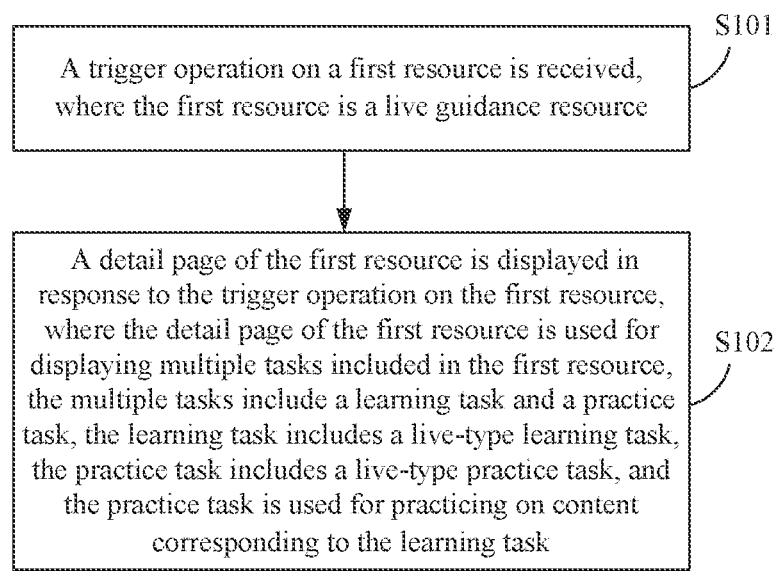
FIG. 1 is a flow diagram of an information processing method according to an embodiment of the present disclosure.

Reference is made to FIG. 1, which shows a flow diagram of an information processing method according to an embodiment of the present disclosure. In this embodiment, the method may be executed by a client. As an example, the method may, for example, include the following steps S101 and S102.

In S101, a trigger operation on a first resource is received. The first resource is a live guidance resource.

In an example, a user may perform a trigger operation on the first resource in a target page displayed by the client. For example, identification information of the first resource is displayed in the target page. The user may perform a predetermined operation on the identification information of the first resource, to perform the trigger operation on the first resource. For example, the user may click on the identification information of the first resource, to perform the trigger operation for the first resource. The identification information of the first resource referred to herein may include, for example, a theme of the first resource and/or a cover image reflecting the theme, which will not be limited in embodiments of the present disclosure.

The first resource is not specifically limited in the embodiments of the present disclosure. The first resource may be a live guidance resource. The live guidance resource may be a resource guidance instructing a user to start a live streaming. As an example, the first resource may be a live-start guidance resource. The live-start guidance resource may be used to guide the user on how to perform a live operation during the live streaming.

In an embodiment of the present disclosure, the target page may be any page displayed on the client. In an example, the target page may include multiple live guidance resources. The multiple live guidance resources include the first resource.

In S102, a detail page of the first resource is displayed in response to the trigger operation on the first resource. The detail page of the first resource is used for displaying multiple tasks included in the first resource. The multiple tasks include a learning task and a practice task. The learning task includes a live-type learning task, and the practice task includes a live-type practice task. The practice task is used for practicing on content corresponding to the learning task.

After receiving the trigger operation on the first resource, the client may display a detail page of the first resource in response to the trigger operation on the first resource. The detail page of the first resource is used to display detailed information on the first resource.

In an example, the detailed information of the first resource may include multiple tasks included in the first resource. In an embodiment of the present disclosure, the first resource may be the live guidance resource. The live guidance resource may include a live guidance video, a learning task and a practice task, in order to make the user expertly apply the live functions. The learning task mentioned herein refers to a live-type learning task. The practice task mentioned herein refers to a live-type practice task, and the practice task is used to practice on content corresponding to the learning task.

The learning task is not specifically limited in an embodiment of the present disclosure. The learning task is a task for learning a live function. The learning task may for example be reading an article related to the live streaming, watching a live image, or watching the live guidance video. In an example, when the first resource is a live-start guidance resource, the learning task may for example be a watch task for a live-start guidance video, or the learning task may include watching a guidance video for starting a live streaming. Correspondingly, the practice task is a task to practice the live function. The practice task may be a live-start task. In other words, the practice task may include initiating a live streaming.

In the case that the live guidance resource is the article related to the live streaming, the learning task is a task to read an article related to the live streaming, and the practice task is a task to practice the content learned from the article. In the case that the live guidance resource is the live guidance video, the learning task is a task to watch the live guidance video, and the practice task is a task to practice the content learned from live guidance video.

In an example, the user may learn by means of the learning task. For example, in the case that the learning task is a watch task for a live-start guidance video, the user may perform a trigger operation on the learning task. Accordingly, the client may display a video play page, in response to the trigger operation on the learning task. The video play page may be used to play the live-start guidance video. In this way, the user can learn the live functions through the live-start guidance video. The live-start guidance video may be used to introduce how to start a live streaming, and the relevant live operations that the user can perform during the live starting process.

In an example, after the user has learned through the learning task, the user may practice the content learned through the learning task, through the practice task. Thus, the content learned through the learning task is consolidated. For example, the user may perform a trigger operation on the practice task. Accordingly, the client may display a live-start page in response to the trigger operation on the practice task. Further, the user may trigger a live-start confirmation operation on the live-start page. The live page may be displayed in response to the live-start confirmation operation. For example, the live-start page may include a live-start control. The live-start confirmation operation may be for example a click or double click operation the live-start control. The live page may be displayed by triggering the live-start control on the live-start page.

Further, in an example, in addition to the aforementioned learning task and practice task, the multiple tasks included in the first resource may also include a test task. The test task may, for example, test the live functions mastered by the user through the learning task and practice task.

As can be seen from the above description that with the solution of the embodiment of the present disclosure, since the first resource includes the learning task and the practice task, the user can consolidate, through the practice task, the live functions learned through the learning task. Thus, the user can master the learned live functions proficiently. Further, the user can well master the live functions provided by the application, thereby improving the user experience of live streaming through the application.

In an example, the practice task may for example include at least one to-be-practiced live operation. The to-be-practiced live operation mentioned herein may be an operation which can be performed by the user during the live experience. The to-be-practiced live operation includes, but is not limited to, initiating a co-hosting in the live streaming, setting a wish, or the like, which will not be listed here.

In order to enable the user to practice the content learned through the learning task, the live page may include information on the first to-be-practiced live operation. The at least one to-be-practiced live operation may include the first to-be-practiced live operation.

The information on the first to-be-practiced live operation may include a name of the first to-be-practiced live operation and a completion progress of the first to-be-practiced live operation. The user may determine the operation to be practiced, based on the name of the first to-be-practiced operation, and the user may determine the completion progress of the first to-be-practiced operation, based on the completion progress of the first to-be-practiced live operation, thereby assisting the user in determining the operation to be performed during the live streaming.

In an example, the live page may further include a first control for triggering a display of detailed information of the first resource. The user may view the detailed information of the first resource through the first control. The detailed information of the first resource mentioned herein may, for example, include multiple tasks included in the first resource. For this case, the user may view the detailed information by a trigger operation on the first control, during the live streaming. Thus, the relative position of the current live task in the first resource may be determined. For example, the current live task is determined as the last task in the first resource. Alternatively, it is determined that other tasks follow the current live task.

In an example, the information on the first to-be-practiced live operation and the first control may be displayed in a predetermined area of the live page. For example, an area at the upper right corner of the live page serves as the predetermined area for displaying the information of the first to-be-practiced live operation and the first control.

In an example, in order to motivate the user to learn the live functions through the first resource, a first virtual object may be associated with the first resource. The user may obtain the first virtual object after the user completes all tasks included in the first resource. The first virtual object may not be specifically limited in an embodiment of the present disclosure. The first virtual object, for example, may be virtual resources, such as props, traffic cards, gifts, which is not limited in an embodiment of the present disclosure.

In an example, the first virtual object is managed by the first resource, the practice task is the last task of the multiple tasks, and the first to-be-practiced live operation is the last to-be-practiced operation in the practice task. In this case, the client may display an identification of the first virtual object in the live page, within a predetermined time period after the first to-be-practiced live operation is completed. In this case, the user may determine that all tasks corresponding to the first resource have been completed based on the identification of the first virtual object displayed in the live page, and confirm that the first virtual object may be obtained.

The predetermined time period is not specifically limited in the embodiments of the present disclosure. For example, the predetermined time period may be a duration of 5 s or other duration, which will not be enumerated herein.

In an embodiment of the present disclosure, the identification of the first virtual object may be displayed in any area of the live page.

On one hand, considering the limited size of the live page, too much content displayed in the live page is easy to bring disturbance to the user. On the other hand, considering that multiple tasks included in the first resource have been completed, it is less likely for a user to view the detailed information of the first resource by triggering the first control in the live page. Therefore, in an implementation of "displaying the identification of the first virtual object in the live page", the first control may be replacing with the identification of the first virtual object.

In an example, after a user triggers a live-start confirmation operation on the live-start page, the client may display a live page. In a broadcast starting process, the live page may include a portal for displaying a live-start guidance video. The user may perform a trigger operation through the portal. Accordingly, the client may, in response to the trigger operation for the portal, play the live-start guidance video on the live page in a window mode. In this way, the user can watch the live-start guidance video while practicing the live streaming, thus facilitating the user's proficiency in the guidance content in the live-start guidance video.

As described above, in an example, the live page may include a first control. As an example, the user may perform a trigger operation on the first control. Accordingly, the client may display detailed information of the first resource in response to the trigger operation on the first control. The detailed information of the first resource includes the multiple tasks described above. In an example, the client may display the detailed information of the first resource on the live page in a floating layer.

In an example, in order to avoid a floating window interfering with the user's view of content of the live page, the client may determine a key element in the live page; and display the floating window in a display area other than a display area corresponding to the key element. The key element is not specifically limited in an embodiment of the present disclosure. The key element may be, for example, an object that is currently explained by an anchor in the live streaming video.

In an example, the user may perform a trigger operation on a learning task among the multiple tasks displayed in the floating window. Accordingly, the client may, in response to the trigger operation on the learning task, play the live-start guidance video corresponding to the learning task on the live page in the window mode. In this way, the user can watch the live-start guidance video and practice the live streaming at the same time.

In yet another example, it is considered that there may have some interference to the live streaming if the user watches the live-start guidance video during the live streaming. Therefore, after the user performs the trigger operation on the learning task of the multiple tasks displayed in the floating window, the client may output a prompt message in response to the trigger operation on the learning task of the multiple tasks. The prompt message is used to indicate that the learning task is incapable of being started during the practice task.

As described above, the practice task may include at least one to-be-practiced live operation. In an example, the at least one to-be-practiced live operation may include a second to-be-practiced live operation, in addition to the first to-be-practiced live operation. In an example, if the second to-be-practiced live operation is completed, the client may display information on the second to-be-practiced live operation in the live page, within a predetermined time period after the second to-be-practiced live operation is completed, in response to the completion of the second to-be-practiced live operation. The information on the second to-be-practiced live operation includes: a name of the second to-be practiced live operation and a completion progress of the second to-be-practiced live operation. By displaying the information on the second to-be-practiced live operation, the user may determine that the second to-be-practiced live operation has been completed during the live streaming.

In an example, the client may display the information on the second to-be-practiced live operation in a specific area of the live page. In yet another example, the information on the first to-be-practiced live operation is displayed in the live page when the second to-be-practiced live operation is completed. In this case, in a specific implementation of the client displaying the information on the second to-be-practiced live operation, the information on the first to-be-practiced live operation in the live page may be replaced with the information on the second to-be-practiced live operation, thus to avoid displaying information of multiple to-be-practiced live operations in the live page at the same time and bring visual disturbance to the user due to too much content displayed on the live page.

In an example, the user may trigger a live-stop operation to end the live streaming at a certain time after starting the live streaming. Accordingly, the client may display a first page in response to the live-stop operation. The first page includes information on a second resource. Similar to the first resource, the second resource may also be a live guidance resource, and the information on the second resource may also include a name of the second resource and a completion status of the second resource. In an example, the second resource may be the first resource, or a resource similar to the first resource. By displaying information on the second resource in the first page, the efficiency of the user obtaining the resource can be improved.

In an example, if the second resource is associated with a second virtual object, the information on the second resource may also include an identification of the second virtual object. Thus, the user can determine that all tasks included in the second resource have been completed, and then acquire the second virtual object. With respect to the second virtual object, reference may be made to the above description about the first virtual object, which will not be repeated herein.

With respect to the second resource, it is noted that the second resource may be a live guidance resource that is ranked at the front in multiple live guidance resources sorted according to a predetermined rule. The predetermined rule is not specifically limited in an embodiment of the present disclosure, which may be determined according to an actual situation. For example, the multiple live guidance resources are sorted in the order of: "Completed all tasks included in the resource and did not acquire the corresponding virtual object"→"Completed some tasks included in the resource-"→"Associated with a virtual object". For this case, in an example, if the practice task is the last task of the first resource and the first virtual object associated with the first resource has not been acquired, then the second resource may be the first resource.

In an example, a user may perform a trigger operation for information on the second resource in the first page. Accordingly, the client may display a second page, in response to the trigger operation for the information on the second resource. The second page may include at least one live guidance resource. The at least one live guidance resource includes the first resource and the second resource. As an example, a user may perform a trigger operation on any of live guidance resources in the second page, to view a detail page of the live guidance resource. In an example, the second page and the target page may be the same page. In this way, the user can perform a trigger operation for the information on the second resource in the first page after the practice task in completed. Thus, the client displays the second page, so that the user can continue learning the live functions through other resources on the second page.

In an example, the user may also trigger a favorite operation for any live guidance resource in the second page. The client may add any resource to a live guidance resource favorite list, in response to the favorite operation for any resource in the second page. In an embodiment, the second page further includes a favorite list identification. The user may perform a trigger operation on the favorite list identification. The client may display the live guidance resource favorite list in response to the trigger operation on the favorite list identification.

In an example, the second page may further include information on a third resource, and the third resource is any one of the multiple live guidance resources. Similar to the information on the first resource, the information on the third resource may include a name of the third resource and a completion status of the third resource. In an example, the second page may include a first display area and a second display area. The first display area is used for displaying the at least one live guidance resource, and the second display area is used for displaying the information on the third resource.

The first display area and the second display area are not specifically limited in an embodiment of the present disclosure. In an example, the second display area may be located at the bottom of the second page, and the first area is located above the second display area.

In an example, the first display area includes several sub-areas, and one of sub-regions is used for displaying identification information of a live guidance resource. Regarding the identification information of the live guidance resource, reference may be made to the description of the identification information of the first resource above, which will not be repeated here.

With respect to the third resource, it is noted that, in an example, the third resource may be a live guidance resource in the top ranking after the multiple live guidance resources are sorted according to a predetermined rule. With respect to the predetermined rule, reference may be made to the relevant description above, which will not be repeated here.

In an example, if the multiple tasks included in the first resource are all completed, the client may display a first window, in response to completion of the multiple tasks included in the first resource. The first window is used to display an identification, description information and an acquisition control of the first virtual object. Accordingly, the user may perform a trigger operation on the acquisition control. The client may obtain the first virtual object in response to the trigger operation on the acquisition control.

The identification of the first virtual object referred to herein may, for example, be an image that indicates the first virtual object. The description information of the first virtual object may, for example, be a text for describing the first virtual object.

In an example, if the practice task is the last task included in the first resource, in an implementation of "displaying a first window", the first window may be displayed after a live-stop operation is received, such that the user can obtain the first virtual object through the acquisition control in the first window.

In yet another example, if the practice task is the last task included in the first resource and multiple to-be-practiced live operations included in the practice task are completed during the live streaming, in an implementation of "displaying a first window", the client may display the first window in the live page, such that the user can obtain the first virtual object through the acquisition control in the first window.

For ease of understanding, solutions of embodiments of the present disclosure are described in conjunction with the drawings.

Figure 2:
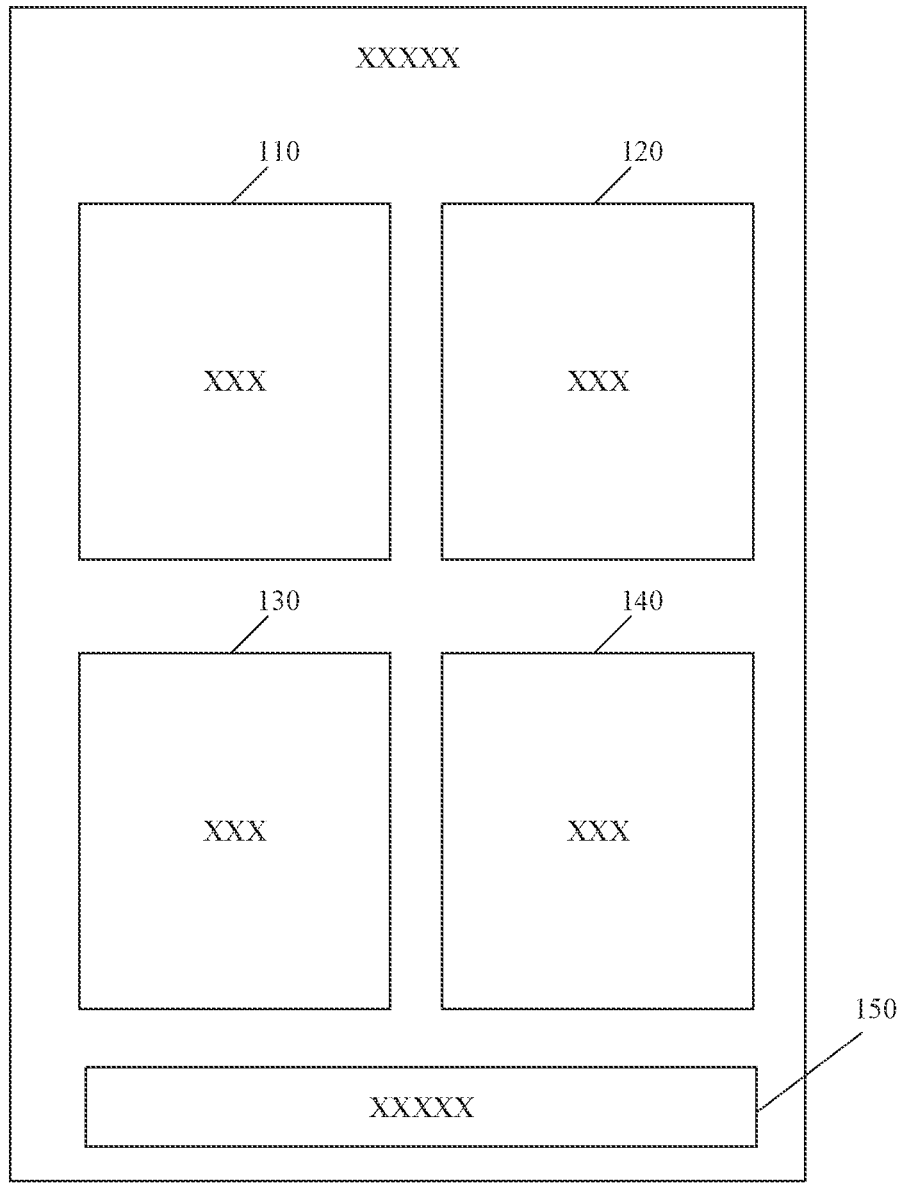
FIG. 2 is a structural schematic diagram of a target page according to an embodiment of the present disclosure.

Reference is made to FIG. 2, which shows a structural schematic diagram of a target page according to an embodiment of the present disclosure.

As shown in FIG. 2, the target page 100 includes five areas, namely, an area 110, an area 120, an area 130, an area 140, and an area 150. Each of the four areas including the area 110, the area 120, the area 13 and the area 140 is used to display identification information on one live guidance resource. For example, the area 110 is used to display identification information on live guidance resource 1, the area 120 is used to display identification information on live guidance resource 2, the area 130 is used to display identification information on live guidance resource 3, and the area 140 is used to display identification information on live guidance resource 4.

The area 150 is used to display information on one or more live guidance resources. The live guidance resources corresponding to area 150 may be a live guidance resource at top ranking when the aforementioned live guidance resource 1 to live guidance resource 4 are sorted according to a predetermined rule.

Figure 3:
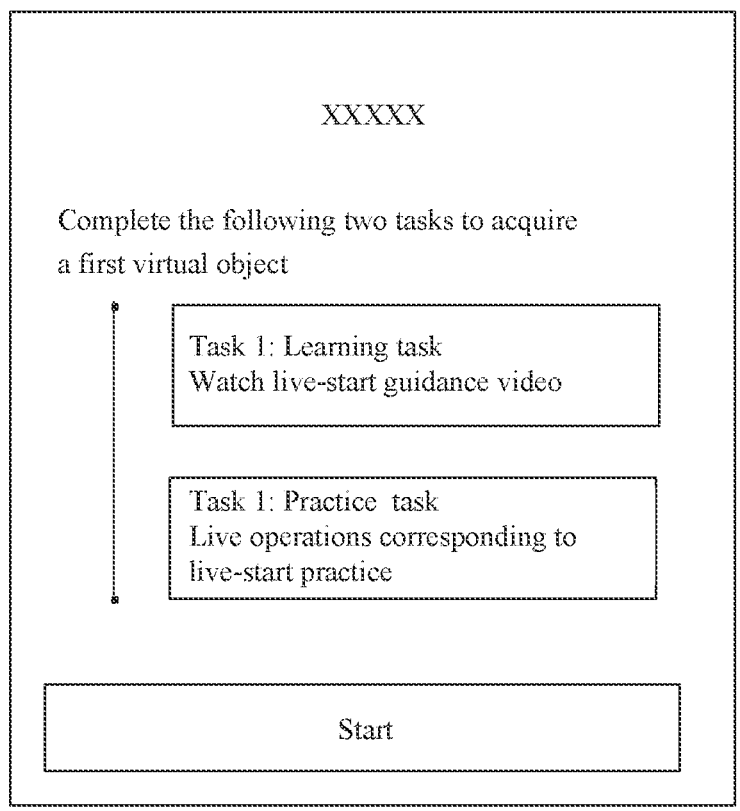
FIG. 3 is structural schematic diagram of a detail page according to an embodiment of the present disclosure.

After the user performs a trigger operation for area 110, the client displays a detail page 300 as shown in FIG. 3. The detail page shown in FIG. 3 is the detail page corresponding to live guidance resource 1. The detail page includes two tasks, the first task is to watch the live-start guidance video and the second task is to start the live streaming.

In an example, after completing the learning task, the user may further begin the practice task. For example, the user may click on the area shown in FIG. 3 where the practice task is located, and further trigger a live-start task though the "Start" control shown in FIG. 3.

Figure 4A:
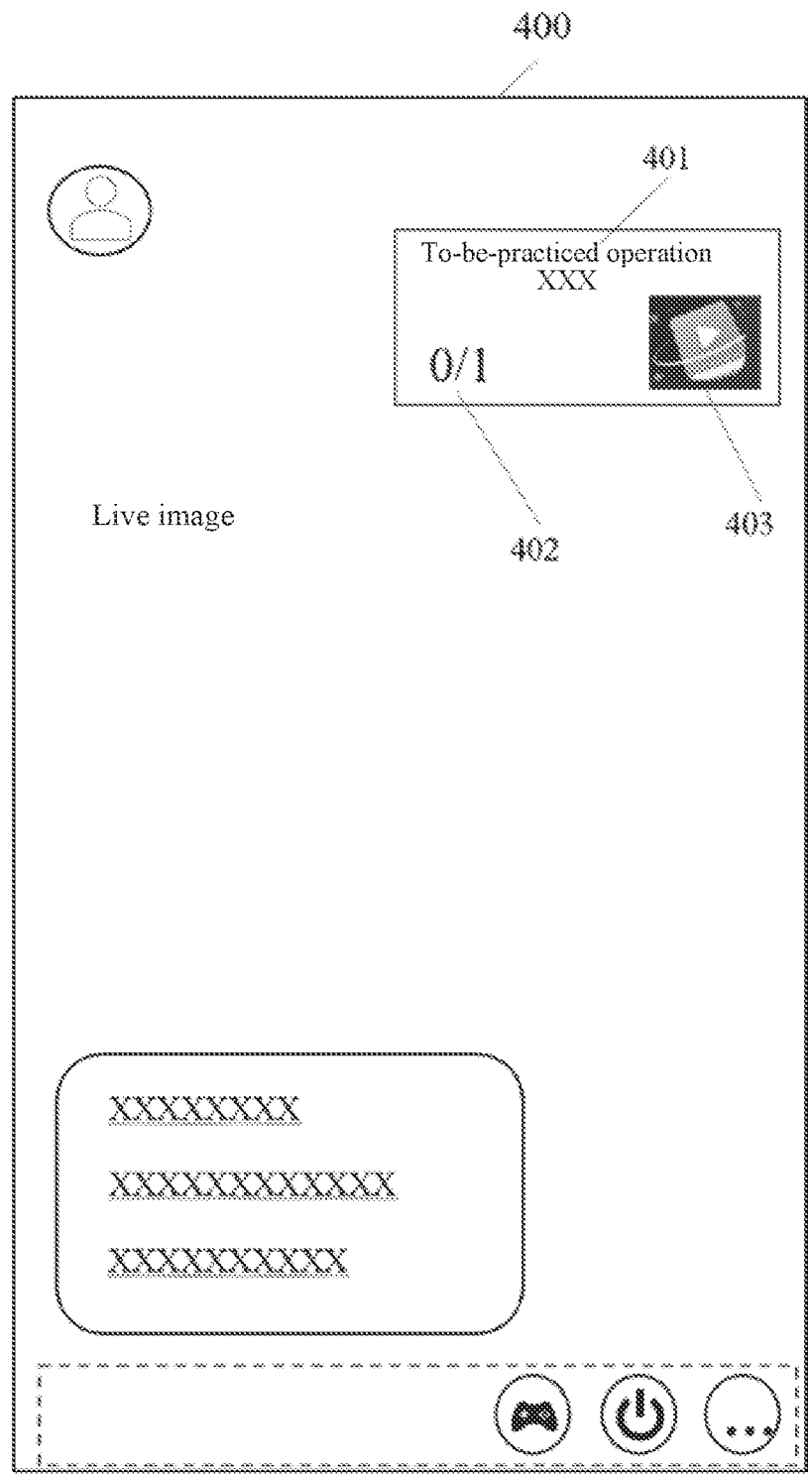
FIG. 4a is a structural schematic diagram of a live page according to an embodiment of the present disclosure.

When the user performs the live-start task, the corresponding live page is shown in FIG. 4a. As shown in FIG. 4a, in a process of starting the live streaming, area 410 of the live page 400 includes a name 401 of the first to-be-practiced live operation, a progress indication information 402 indicating that the first to-be-practiced live operation is not completed, and a first control 403.

Figure 4B:
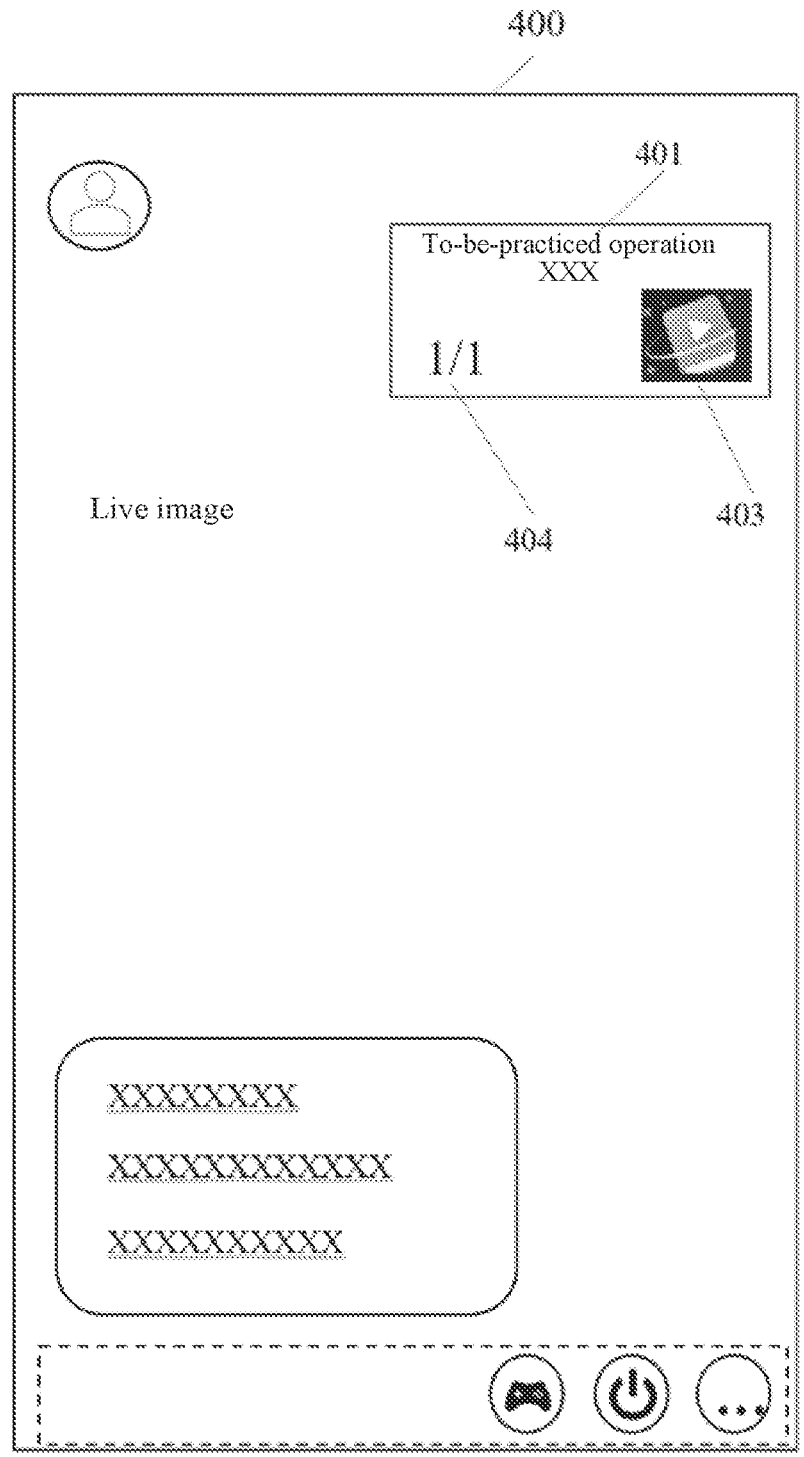
FIG. 4b is structural schematic diagram of another live page according to an embodiment of the present disclosure.

In an example, upon completion of the first to-be-practiced operation, content displayed on the live page is updated with content as shown in FIG. 4b. In FIG. 4b, the progress indication information 402 is updated with progress indication information 404 indicating that the first to-be-practiced live operation has been completed.

Figure 4C:
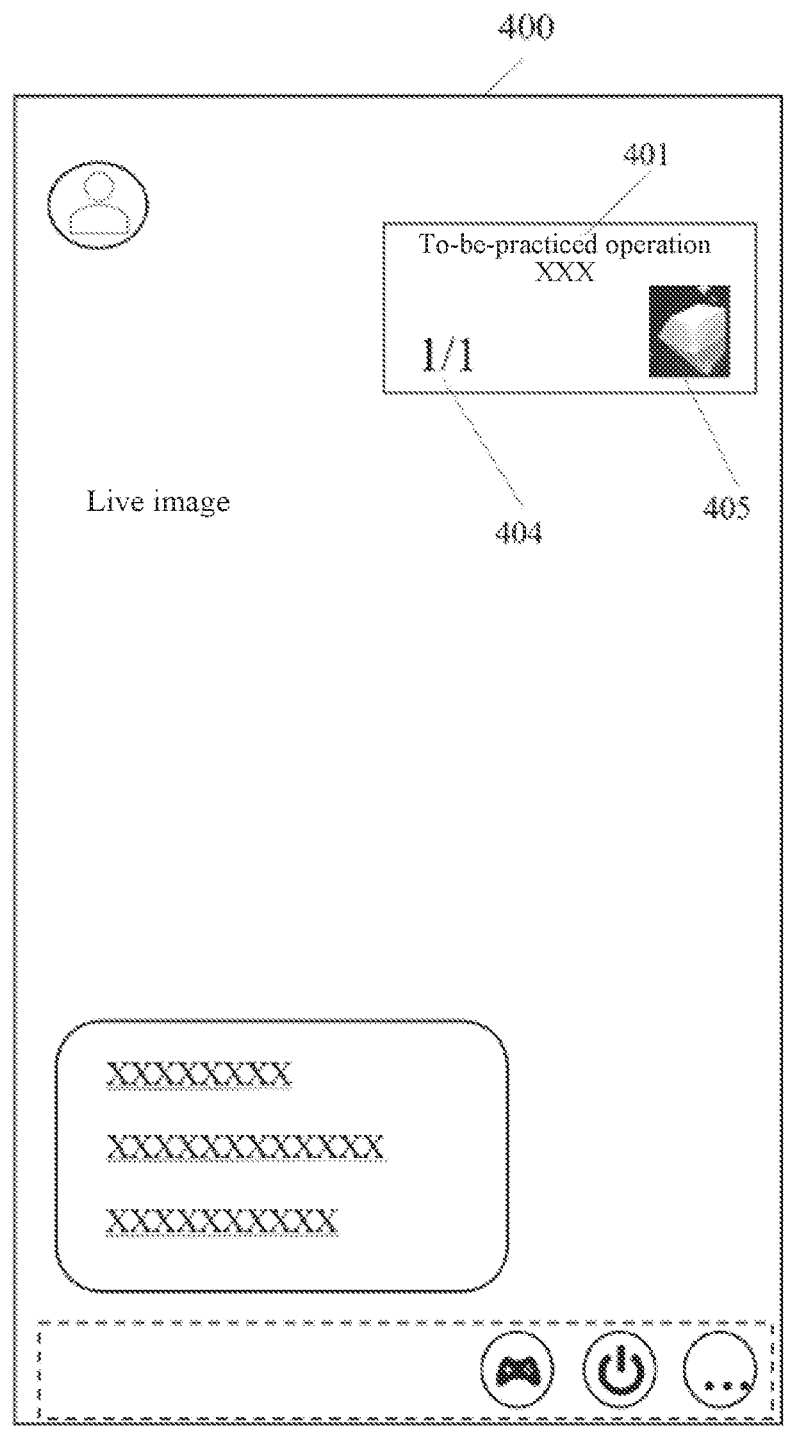
FIG. 4c is structural schematic diagram of yet another live page according to an embodiment of the present disclosure.

In yet another example, if the practice task is the last task included in the first resource, the first to-be-practiced live operation is completed, and the first to-be-practiced live operation is the last to-be-practiced operation in the practice task, then the content displayed on the live page is updated to the content as shown in FIG. 4c. In FIG. 4c, the first control is updated with an identification 405 of the first virtual object associated with the first resource.

It is noted that FIG. 2 to FIG. 4c are shown simply for the convenience of understanding the relevant aspects of the present solution, and they do not constitute a limitation of embodiments of the present disclosure.

Exemplary Device

Based on the method provided in the above embodiments, a device is further provided in an embodiment of the present disclosure, and is described below in conjunction with the accompanying drawings.

Figure 5:
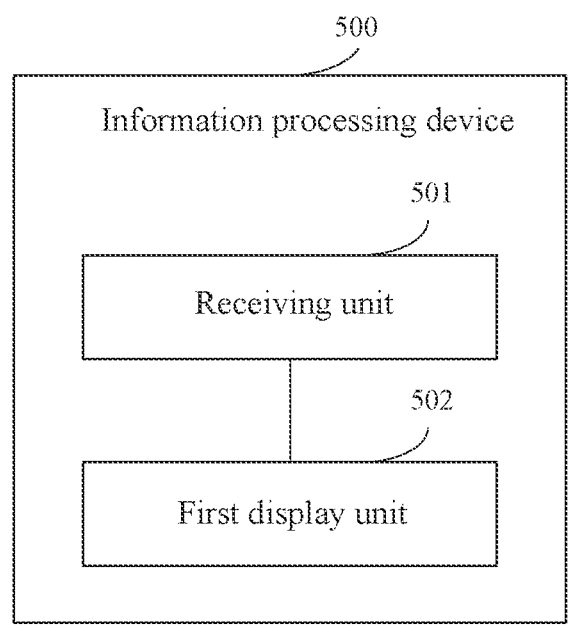
FIG. 5 is a structural schematic diagram of an information processing device according to an embodiment of the present disclosure.

Reference is made to FIG. 5, which shows a structural schematic diagram of an information processing device according to an embodiment of the present disclosure. The device 500 may specifically include, for example, a receiving unit 501 and a first display unit 502.

The receiving unit 501 is configured to receive a trigger operation on a first resource. The first resource is a live guidance resource.

The first display unit 502 is configured to display a detail page of the first resource, in response to the trigger operation on the first resource. The detail page of the first resource is used for displaying multiple tasks included in the first resource. The multiple tasks include a learning task and a practice task. The learning task includes a live-type learning task. The practice task includes a live-type practice task, and the practice task is used for practicing on content corresponding to the learning task.

In an embodiment, the first resource is a live-start guidance resource, the learning task is a watch task for a live-start guidance video, and the practice task is a live-start task. The device further includes: a second display unit and/or a third display unit.

The second display unit is configured to display a live-start page, in response to a trigger operation on the practice task.

The third display unit is configured to display a video play page to play the live-start guidance video, in response to a trigger operation on the learning task.

In an embodiment, the device further includes: a fourth display unit.

The fourth display unit is configured to display a live page, in response to a live-start confirmation operation triggered on the live-start page. The live page includes information on a first to-be-practiced live operation. The information on the first to-be-practiced live operation includes: a name of the first to-be-practiced live operation and a completion progress of the first to-be-practiced live operation.

In an embodiment, the live page further includes a first control, and the first control is used to trigger a display of detailed information of the first resource.

In an embodiment, the first resource is associated with a first virtual object, the practice task is a last task among the multiple tasks, and the first to-be-practiced live operation is a last to-be-practiced operation in the practice task. The device further includes: a fifth display unit.

The fifth display unit is configured to display an identification of the first virtual object in the live page, within a predetermined time period after the first to-be-practiced live operation is completed.

In an embodiment, the fifth display unit is configured to replace the first control for triggering the display of detailed information of the first resource with the identification of the first virtual object.

In an embodiment, the first resource is associated with the first virtual object, and the device further includes: a fifth display unit and an acquisition unit.

The fifth display unit is configured to display a first window, in response to completion of the multiple tasks included in the first resource. The first window is used for displaying an identification, descriptive information and an acquisition control of the first virtual object.

The acquisition unit is configured to acquire the first virtual object, in response to a trigger operation on the acquisition control.

In an embodiment, the device further includes: a sixth display unit and a playing unit.

The sixth display unit is configured to display a live page, in response to a live-start confirmation operation triggered on the live-start page.

The playing unit is configured to play the live-start guidance video on the live page in a window mode, during a live starting process.

In an embodiment, the device further includes: a seventh display unit and an output unit.

The seventh display unit is configured to display the detailed information of the first resource, in response to a trigger operation on the first control, where the detailed information of the first resource includes the multiple tasks.

The output unit is configured to output a prompt message, in response to a trigger operation on the learning task of the multiple tasks, where the prompt message is used to indicate that the learning task is incapable of being started during the practice task.

In an embodiment, the device further includes: a replacement unit.

The replacement unit is configured to replace the information on the first to-be-practiced live operation in the live page with information on a second to-be-practiced live operation, in response to a completion of the second to-be-practiced live operation, where the information of the second to-be-practiced live operation includes: a name of the second to-be-practiced live operation and a completion progress of the second to-be-practiced live operation.

In an embodiment, the device further includes: an eighth display unit.

The eighth display unit is configured to display a first page, in response to a live-stop operation, where the first page includes information on a second resource, the information on the second resource includes: a name of the second resource and a completion status of the second resource, and the second resource is a live guidance resource.

In an embodiment, the second resource is associated with a second virtual object, and the information of the second resource further includes an identification of the second virtual object.

In an embodiment, the device further includes: a ninth display unit.

The ninth display unit is configured to display a second page, in response to a trigger operation for the information on the second resource, wherein the second page includes at least one live guidance resource, and the at least one live guidance resource includes the first resource and the second resource.

In an embodiment, the second page includes a first display area and a second display area. The first display area is used for displaying the at least one live guidance resource, and the second area is used for displaying information on a third resource of the at least one live guidance resource. The information on the third resource includes a name of the third resource and a completion status of the third resource. The third resource is a resource that is ranked first in multiple resources sorted according to a predetermined rule.

Since the device 500 corresponds to the information processing method provided in the above method embodiments, the specific implementation of each unit of the device 500 has the same idea as the above method embodiments. Therefore, regarding the specific implementation of each unit of the device 500, reference may be made to the relevant description of the above method embodiment, which will not be repeated here.

An apparatus is further provided in an embodiment of the present disclosure. The apparatus includes a processor and a memory.

The processor is used to execute instructions stored in the memory, to cause the apparatus to perform the information processing method described in any one of the method embodiments above.

A computer readable storage medium is provided in an embodiment of the present disclosure. The computer readable storage medium includes instructions, and the instructions are configured to instruct an apparatus to perform the information processing method described in any one of the method embodiments above.

A computer program product is provided in an embodiment of the present disclosure. The computer program product, when running on a computer, causes the computer to perform the information processing method described in any one of the method embodiments above.

Other embodiments of the present disclosure will readily come to the mind of those skilled in the art upon consideration of the specification and practice of the invention disclosed herein. The present disclosure is intended to cover any variation, use, or adaptation thereof that follows the general principles of the present disclosure and includes commonly known or customary technical means in the art that are not disclosed herein. The specification and embodiments are to be considered exemplary only, and the true scope and spirit of the present disclosure is indicated by the appended claims.

It is to be understood that the present disclosure is not limited to the precise construction already described above and illustrated in the accompanying drawings, and that various modifications and changes may be made without departing from the scope of the present disclosure. The scope of the present disclosure is limited only by the appended claims.

The foregoing is only a preferred embodiment of the present disclosure and is not intended to limit the present disclosure. Any modification, equivalent substitution, or improvement made within the spirit and principle of the present disclosure shall be included in the scope of protection of the present disclosure.

The invention claimed is:

1. An information processing method, comprising:
receiving a trigger operation on a first resource, wherein the first resource is a live guidance resource; and
displaying a detail page of the first resource, in response to the trigger operation on the first resource, wherein the detail page of the first resource is used for displaying a plurality of tasks comprised in the first resource, the plurality of tasks comprises a learning task and a practice task associated with the learning task, the learning task comprises a live-type learning task, the practice task comprises a live-type practice task, and the practice task is used for practicing on content corresponding to the learning task.

2. The method according to claim 1, wherein the first resource is a live-start guidance resource, the live-start guidance resource comprises a live-start guidance video, the learning task is a watch task for the live-start guidance video, and the practice task is a live-start task, and wherein the method further comprises:
displaying a live-start page, in response to a trigger operation on the practice task; and/or,
displaying a video play page to play the live-start guidance video, in response to a trigger operation on the learning task.

3. The method according to claim 2, further comprising:
displaying a live page, in response to a live-start confirmation operation triggered on the live-start page, wherein the live page comprises information on a first to-be-practiced live operation, and the information on the first to-be-practiced live operation comprises: a name of the first to-be-practiced live operation and a completion progress of the first to-be-practiced live operation.

4. The method according to claim 3, wherein the live page further comprises a first control, wherein the first control is used to trigger a display of detailed information of the first resource.

5. The method according to claim 4, wherein the first resource is associated with a first virtual object, the practice task is a last task among the plurality of tasks, and the first to-be-practiced live operation is a last to-be-practiced operation in the practice task, and wherein the method further comprises:
displaying an identification of the first virtual object in the live page, within a predetermined time period after the first to-be-practiced live operation is completed.

6. The method according to claim 5, wherein the displaying an identification of the first virtual object in the live page comprises:
replacing the first control for triggering the display of the detailed information of the first resource with the identification of the first virtual object.

7. The method according to claim 1, wherein the first resource is associated with a first virtual object, and method further comprises:
displaying a first window, in response to a completion of the plurality of tasks comprised in the first resource, wherein the first window is used for displaying an identification, descriptive information and an acquisition control of the first virtual object; and
acquiring the first virtual object, in response to a trigger operation on the acquisition control.

8. The method according to claim 2, further comprising:
displaying a live page, in response to a live-start confirmation operation triggered on the live-start page; and playing the live-start guidance video on the live page in a window mode, in a live starting process.

9. The method according to claim 4, further comprising:
displaying the detailed information of the first resource, in response to a trigger operation on the first control, wherein the detailed information of the first resource comprises the plurality of tasks; and
outputting a prompt message, in response to a trigger operation on the learning task of the plurality of tasks, wherein the prompt message is used to indicate that the learning task is incapable of being started during the practice task.

10. The method according to claim 3, further comprising:
replacing the information on the first to-be-practiced live operation in the live page with information on a second to-be-practiced live operation, in response to a completion of the second to-be-practiced live operation, wherein the information on the second to-be-practiced live operation comprises: a name of the second to-be-practiced live operation and a completion progress of the second to-be-practiced live operation.

11. The method according to claim 3, further comprising:
displaying a first page in response to a live-stop operation, wherein the first page comprises information on a second resource, the information on the second resource comprises: a name of the second resource and a completion status of the second resource, and the second resource is a live guidance resource.

12. The method according to claim 11, wherein the second resource is associated with a second virtual object, and the information on the second resource further comprises an identification of the second virtual object.

13. The method according to claim 11, further comprising:
displaying a second page, in response to a trigger operation on the information of the second resource, wherein the second page comprises at least one live guidance resource, and the at least one live guidance resource comprises the first resource and the second resource.

14. The method according to claim 13, wherein the second page comprises a first display area and a second display area, the first display area is used for displaying the at least one live guidance resource, the second display area is used for displaying information on a third resource of the at least one live guidance resource, the information on the third resource comprises a name of the third resource and a completion status of the third resource, and the third resource is a resource that is ranked first in a plurality of resources sorted according to a predetermined rule.

15. An apparatus, comprising a processor and a memory, wherein
the processor is configured to execute instructions stored in the memory, to cause the apparatus to:
receive a trigger operation on a first resource, wherein the first resource is a live guidance resource; and
display a detail page of the first resource, in response to the trigger operation on the first resource, wherein the detail page of the first resource is used for displaying a plurality of tasks comprised in the first resource, the plurality of tasks comprises a learning task and a practice task associated with the learning task, the learning task comprises a live-type learning task, the practice task comprises a live-type practice task, and the practice task is used for practicing on content corresponding to the learning task.

16. The apparatus according to claim 15, wherein the first resource is a live-start guidance resource, the live-start guidance resource comprises a live-start guidance video, the learning task is a watch task for a live-start guidance video, and the practice task is a live-start task, and
wherein the processor is configured to execute instructions stored in the memory, to cause the apparatus to:
display a live-start page, in response to a trigger operation on the practice task;
and/or,
display a video play page to play the live-start guidance video, in response to a trigger operation on the learning task.

17. The apparatus according to claim 16, wherein the processor is configured to execute instructions stored in the memory, to cause the apparatus to:
display a live page, in response to a live-start confirmation operation triggered on the live-start page, wherein the live page comprises information on a first to-be-practiced live operation, and the information on the first to-be-practiced live operation comprises: a name of the first to-be-practiced live operation and a completion progress of the first to-be-practiced live operation.

18. The apparatus according to claim 17, wherein the live page further comprises a first control, wherein the first control is used to trigger a display of detailed information of the first resource.

19. The apparatus according to claim 18, wherein the first resource is associated with a first virtual object, the practice task is a last task among the plurality of tasks, and the first to-be-practiced live operation is a last to-be-practiced operation in the practice task, and
wherein the processor is configured to execute instructions stored in the memory, to cause the apparatus to:
display an identification of the first virtual object in the live page, within a predetermined time period after the first to-be-practiced live operation is completed.

20. A non-transitory computer readable storage medium, comprising instructions, wherein the instructions are configured to instruct a device to:
receive a trigger operation on a first resource, wherein the first resource is a live guidance resource; and
display a detail page of the first resource, in response to the trigger operation on the first resource, wherein the detail page of the first resource is used for displaying a plurality of tasks comprised in the first resource, the plurality of tasks comprises a learning task and a practice task associated with the learning task, the learning task comprises a live-type learning task, the practice task comprises a live-type practice task, and the practice task is used for practicing on content corresponding to the learning task.

* * * * *